(12) United States Patent
Woo et al.

(10) Patent No.: US 8,503,765 B2
(45) Date of Patent: Aug. 6, 2013

(54) METHOD AND APPARATUS FOR CORRECTING ERRORS IN STEREO IMAGES

(75) Inventors: Dae Sic Woo, Seoul (KR); Byoung Ki Jeon, Seoul (KR); A Ran Kim, Seoul (KR); Hong Woo Lee, Seongnam Si (KR); Jong Dae Kim, Seoul (KR); Won Suk Chung, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 0 days.

(21) Appl. No.: 13/636,998

(22) PCT Filed: Apr. 8, 2011

(86) PCT No.: PCT/KR2011/002473
§ 371 (c)(1),
(2), (4) Date: Sep. 24, 2012

(87) PCT Pub. No.: WO2011/155698
PCT Pub. Date: Dec. 15, 2011

(65) Prior Publication Data
US 2013/0009955 A1    Jan. 10, 2013

(30) Foreign Application Priority Data
Jun. 8, 2010    (KR) .......................... 10-2010-0053971

(51) Int. Cl.
*G06K 9/00* (2006.01)
(52) U.S. Cl.
USPC ............................ 382/154; 382/106; 382/168
(58) Field of Classification Search
USPC .................. 382/106, 154, 168–172
See application file for complete search history.

(56) References Cited

U.S. PATENT DOCUMENTS

| | | | |
|---|---|---|---|
| 6,765,618 B1 * | 7/2004 | Sato | 348/348 |
| 2008/0226159 A1 * | 9/2008 | Choi et al. | 382/154 |

FOREIGN PATENT DOCUMENTS

| | | |
|---|---|---|
| JP | 11-98530 | 4/1999 |
| JP | 2001238230 | 8/2001 |
| JP | 2008263528 | 10/2008 |
| JP | 2010506287 | 2/2010 |
| KR | 10-2010-0059013 | 6/2010 |
| WO | 2008-139351 | 11/2008 |

OTHER PUBLICATIONS

International Search Report mailed Dec. 14, 2011 for PCT/KR2011/002473.
Japanese Office Action for 2013-501200 dated Mar. 7, 2013,citing the above reference(s).

* cited by examiner

*Primary Examiner* — Alex Liew
(74) *Attorney, Agent, or Firm* — Lowe Hauptman Ham & Berner, LLP

(57) ABSTRACT

An embodiment of the present invention relates to a method and apparatus for correcting errors in stereo images. The apparatus for correcting errors in stereo images according to an embodiment of the present invention comprises: a space histogram generation unit generating space histogram information using the depth map information on the input image data; a peak frequency generation unit generating a peak frequency using the 2D image data of the input image data; an object analysis unit determining the error in each frame of the input image data on the basis of the space histogram and peak frequency; a depth map error correction unit correcting the depth map information to reduce the error; and a rendering processing unit generating left and right eye images, which are stereo images, by using the corrected depth map information.

24 Claims, 5 Drawing Sheets

| (A) | | | | | | | | (B) | | | | | | | |
|---|---|---|---|---|---|---|---|---|---|---|---|---|---|---|---|
| 78 | 82 | 76 | 79 | 86 | 94 | 102 | 107 | 145 | 132 | 128 | 119 | 108 | 101 | 88 | 86 |
| 97 | 88 | 74 | 82 | 86 | 85 | 95 | 96 | 141 | 130 | 124 | 114 | 93 | 82 | 91 | 76 |
| 117 | 94 | 84 | 87 | 87 | 79 | 90 | 89 | 132 | 129 | 121 | 109 | 81 | 79 | 90 | 68 |
| 121 | 99 | 91 | 94 | 88 | 76 | 78 | 87 | 113 | 97 | 98 | 92 | 80 | 79 | 78 | 54 |
| 122 | 101 | 98 | 118 | 94 | 84 | 80 | 77 | 102 | 111 | 93 | 86 | 92 | 88 | 81 | 65 |
| 109 | 118 | 104 | 122 | 115 | 103 | 84 | 87 | 97 | 102 | 93 | 83 | 91 | 75 | 76 | 75 |
| 119 | 121 | 112 | 128 | 121 | 118 | 98 | 89 | 89 | 86 | 75 | 78 | 87 | 69 | 54 | 59 |
| 124 | 127 | 126 | 121 | 119 | 109 | 112 | 90 | 75 | 76 | 75 | 71 | 65 | 74 | 72 | 54 |

METHOD AND APPARATUS FOR CORRECTING ERRORS IN STEREO IMAGES

CROSS REFERENCE TO RELATED APPLICATION

This application claims the priority of Korean Patent Application No. 10-2010-0053971,filed on June 8, 2010 in the KIPO (Korean Intellectual Property Office). Further, this application is the National Phase application of International Application No. PCT/KR2011/002473 filed April 8, 2011, which designates the United States and was published in Korean.

TECHNICAL FIELD

An embodiment of the present invention relates to a method and apparatus for correcting errors in three-dimensional (3D) images. More particularly, the present invention relates to a method and apparatus for correcting errors in 3D images, which detects an error in depth map information and corrects the error in the process of providing 3D image content, produced by applying the depth map information to input two-dimensional (2D) image content, thus preventing a 3D effect from being reduced by the error in the depth map information.

BACKGROUND ART

With the rapid development of digital technologies and with the diversification of broadcast media due to the convergence of broadcasting and telecommunications, value-added services related to the broadcasting have recently emerged. At present, while the development of video services such as TV broadcasting is directed toward high-definition and large-screen technologies, only 2D image content is provided so far, and thus a viewer cannot perceive a 3D effect from the current 2D image content.

Accordingly, the need for 3D images has gradually increased, but there is a noticeable lack of 3D image content so far. 3D image processing is a key technology in the field of next-generation information technology services and is also a state-of-the-art technology with increased competition together with the development of information industrial society. The 3D image processing technology is an essential element to provide high-quality video services and is applied to a variety of fields such as broadcasting, medical, education, military, games, and virtual reality as well as the information technology field.

Thus, a technology for providing 3D image content from 2D image content is required. However, errors occur during the process of providing the 3D image content from the 2D image content with the current technology, which is problematic.

DISCLOSURE

Technical Problem

Accordingly, the present invention has been made to solve the above-described problems, and an object of an embodiment of the present invention is to a method and apparatus for correcting errors in three-dimensional (3D) images, which can prevent a 3D effect from being reduced due to an error in depth map information in the process of outputting 3D image content.

Technical Solution

An embodiment of the present invention to accomplish the above objects provides an apparatus for correcting errors in three-dimensional (3D) images, the apparatus comprising: a spatial histogram generation unit which generates spatial histogram information using depth map information on input image data; a peak frequency generation unit which generates a peak frequency using two-dimensional (2D) image data of the input image data; an object analysis unit which detects an error in each frame of the input image data based on the spatial histogram and the peak frequency; a depth map error correction unit which, if it is determined that there is an error in the frame, corrects the depth map information such that the error is corrected; and a rendering processing unit which produces a left-eye image and a right-eye image to form a 3D image using the corrected depth map information.

According another object of the present invention, there is provided a method for correcting errors in 3D images, the method comprising: a spatial histogram generation step of generating spatial histogram information using depth map information on input image data; a peak frequency generation step of generating a peak frequency using 2D image data of the input image data; an object analysis step of detecting an error in each frame of the input image data based on the spatial histogram and the peak frequency; a depth map error correction step of, if it is determined that there is an error in the frame, correcting the depth map information such that the error is corrected; and a rendering processing step of producing a left-eye image and a right-eye image to form a 3D image using the corrected depth map information.

According still another object of the present invention, there is provided a method for correcting errors in 3D images, which detects an error in depth map information in the process of providing a 3D image, produced by applying the depth map information to input 2D image data, the method comprising the steps of: determining a specific value beyond a standard deviation of spatial histogram information generated for each of objects, classified according to the depth map information, in each frame of the 2D image data; if the specific value exceeds a first threshold in the positive (+) direction or negative (−) direction of the vertical (Y) axis of the first threshold, classifying the area corresponding to the specific value as an error-prone area; if the peak frequency of the error-prone area exceeds a second threshold in the positive (+) direction or negative (−) direction, determining whether the result of the direction, in which the peak frequency exceeds the first threshold, and the result of the direction, in which the peak frequency exceeds the second threshold, coincide with each other; and if it is determined that the result of the direction, in which the peak frequency exceeds the first threshold, and the result of the direction, in which the peak frequency exceeds the second threshold, do not coincide with each other, determining that there is an error in the depth map information.

According yet another object of the present invention, there is provided a method for correcting errors in 3D images, which corrects an error in depth map information in the process of providing a 3D image, produced by applying the depth map information to input 2D image data, the method comprising the steps of: determining a specific value beyond a standard deviation of spatial histogram information of an error-containing area determined as having an error in the depth map information; determining whether the specific value exceeds a first threshold in the positive (+) direction or negative (−) direction of the vertical (Y) axis; and if it is determined that the specific value exceeds the first threshold, correcting the error by increasing or decreasing the specific value to the standard deviation of the spatial histogram information based on the direction in which the specific value exceeds the first threshold.

According still yet another object of the present invention, there is provided a method for correcting errors in 3D images, which detects an error in depth map information and corrects the error in the process of providing a 3D image, produced by applying the depth map information to input 2D image data, the method comprising the steps of: determining a specific value beyond a standard deviation of spatial histogram information generated for each of objects, classified according to the depth map information, in each frame of the 2D image data; if the specific value exceeds a first threshold, classifying the area corresponding to the specific value as an error-prone area; if the peak frequency of the error-prone area exceeds a second threshold, determining whether the result of the direction, in which the peak frequency exceeds the first threshold, and the result of the direction, in which the peak frequency exceeds the second threshold, coincide with each other; if it is determined that the result of the direction, in which the peak frequency exceeds the first threshold, and the result of the direction, in which the peak frequency exceeds the second threshold, do not coincide with each other, determining that there is an error in the depth map information; and correcting the error by increasing or decreasing the specific value to the standard deviation of the spatial histogram information based on the direction in which the specific value exceeds the first threshold.

Advantageous Effects

As described above, according to an embodiment of the present invention, it is possible to detect an error in depth map information and corrects the error in the process of providing 3D image content, produced by applying the depth map information to input 2D image content, thus preventing a 3D effect from being reduced by the error in the depth map information.

Moreover, according to an embodiment of the present invention, it is possible to detect all errors in separate depth map information, received together with 2D image data or estimated from the 2D image data, and corrects the errors. That is, it is possible to correct the errors when outputting 3D image content, thus allowing a viewer to perceive an improved 3D effect.

MODE FOR INVENTION

Figure 1:
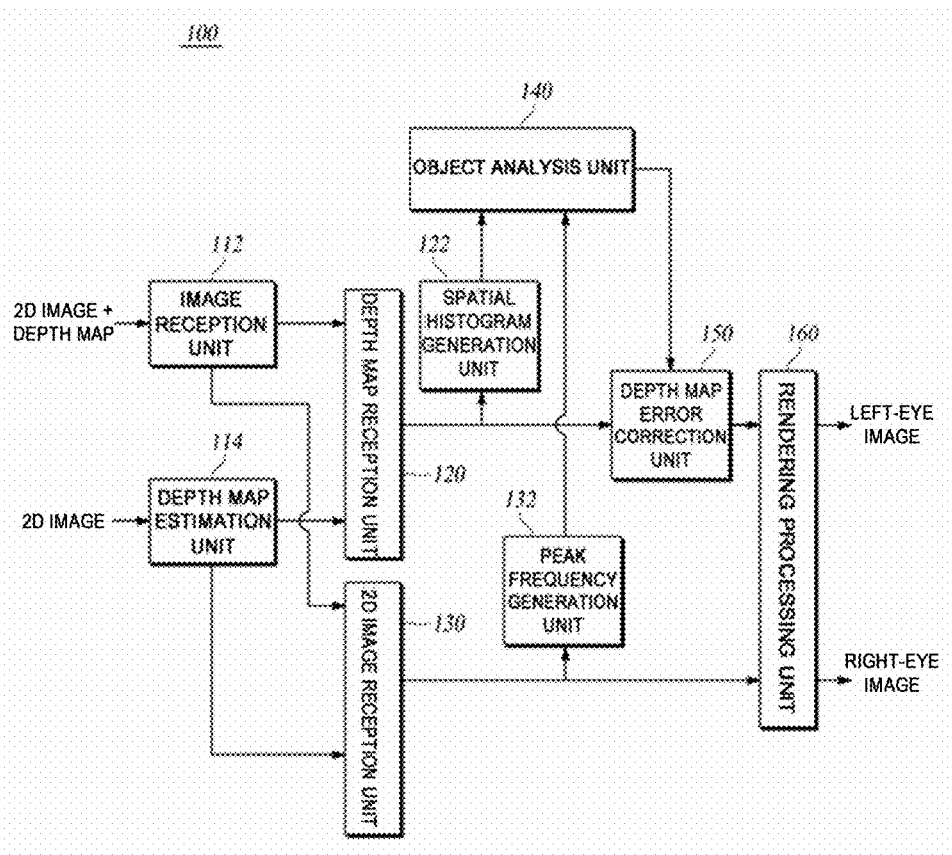
FIG. 1 is a block diagram schematically showing an apparatus for correcting errors in 3D images in accordance with an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms such as first, second, A, B, (a), (b), etc. may be used herein when describing components of the present invention. Each of these terminologies is not used to define an essence, order or sequence of a corresponding component but used merely to distinguish the corresponding component from other components. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram schematically showing an apparatus for correcting errors in 3D images in accordance with an embodiment of the present invention.

An apparatus 100 for correcting errors in 3D images in accordance with an embodiment of the present invention comprises an image reception unit 112, a depth map estimation unit 114, a depth map reception unit 120, a spatial histogram generation unit 122, a 2D image reception unit 130, a peak frequency generation unit 132, an object analysis unit 140, a depth map error correction unit 150, and a rendering processing unit 160. While it is described that the apparatus 100 for correcting errors in 3D images comprises the image reception unit 112, the depth map estimation unit 114, the depth map reception unit 120, the spatial histogram generation unit 122, the 2D image reception unit 130, the peak frequency generation unit 132, the object analysis unit 140, the depth map error correction unit 150, and the rendering processing unit 160 in an embodiment of the present invention, this is intended merely to illustrate the technical idea of an embodiment of the present invention, and those skilled in the art to which the present invention pertains will appreciate that various modifications and changes are made to the components of the apparatus 100 for correcting errors in 3D images, without departing from the essential features of an embodiment of the present invention.

The apparatus for correcting errors in 3D images in accordance with an embodiment of the present invention refers to an apparatus which converts input image data into 3D image data, detects errors in the process of converting the input image data into the 3D image data, and corrects the errors. That is, the apparatus 100 for correcting errors in 3D images refers to an apparatus which may receive 2D image data from an image content provider and convert the received 2D image data into 3D images before displaying the 2D image data. Meanwhile, the apparatus 100 for correcting errors in 3D images may receive depth map information, which is provided separately from the 2D image data, from the image content provider such as a broadcasting company. That is, the apparatus 100 for correcting errors in 3D images can detect errors in the depth map information, which is received from the image content provider or estimated from the 2D image data, and correct the detected errors. Here, the apparatus 100 for correcting errors in 3D images may be mounted in a display device such as a TV, monitor, etc. or may be implemented as a separate device such as a set-top box and connected to the display device. Accordingly, only the conversion of input image data into a left-eye image and a right-eye image for a 3D image, which is performed by the apparatus 100 for correcting errors in 3D images, will be described in the present invention, and the display of the 3D image in a stereoscopic or auto-stereoscopic manner, which is performed by the display device, will not be described separately.

The 3D image described in the present invention may be defined in two aspects. First, the 3D image may be defined as an image to which the depth map information is applied such that a user can feel that a part of the image is projected from a screen. Second, the 3D image may be defined as an image which provides various viewpoints to a user such that the user can feel the sense of reality from the image. That is, the 3D image described in the present invention refers to an image which allows a viewer to perceive an audio-visual 3D effect, thus providing the sense of vitality and reality. The 3D image may be classified into a stereoscopic type, a multi-view type, an integral photography (IP) type, a multi-view (omni) type, a panorama type, and a hologram type based on acquisition method, depth impression, and display method. Methods for displaying 3D images may include image-based reconstruction and mesh-based representation.

Like the human eyes, two images taken from both the left and right sides are required to represent the 3D image. That is, the image taken from the left side is seen by the left eye and the image taken from the right side is seen by the right eye such that the viewer perceives a 3D effect. A broadcast camera for taking 3D images has a structure in which two cameras are placed beside each other or two lenses are provided therein. The 3D image requires the left image and the right image, and thus the size of image data is two times the size of general broadcast data. As a result, the 3D images transmitted as broadcast signals occupy double frequency bands.

The 3D images may be transmitted with the size of general broadcast data by reducing the size of the left and right images by half, respectively, and combining the left and right images, like "Side by Side" method. However, the amount of data is compressed in the horizontal direction, and thus a loss of data occurs. In order to transmit 3D image data while maintaining the amount of data equal to that of general image data, the 2D image data corresponding to general images may be transmitted together with depth map information containing information on 3D image data. The amount of depth map information corresponds to about 10% of the amount of 2D image data, and thus if about 10% of information is added, the 3D images can be displayed. Moreover, when the apparatus 100 for correcting errors in 3D images, which is a reception unit receiving the 2D image, can convert 2D image data into 3D image data, the same amount of information as general image data is required, and thus the 3D images can be displayed without additional data.

Signal data for providing 3D images may be processed in such a manner that both left and right image data are transmitted, the left and right image data are compressed in the horizontal direction and transmitted, the 2D image data and the depth map information are transmitted together, or the 2D image data is converted into 3D image data by the apparatus 100 for correcting errors in 3D images, which is the reception unit. Meanwhile, when the image content provider transmits the image data in such a manner that both the left and right image data are transmitted or the left and right image data are compressed in the horizontal direction and transmitted, the 3D image data is transmitted, and in this case, it is impossible to modify the 3D effect of the 3D images. However, when the 2D image data and the depth map information are transmitted together, or when the apparatus 100 for correcting errors in 3D images, which is the reception unit, converts the 2D image data into the 3D image data, the apparatus 100 for correcting errors in 3D images can control the depth map information, and this it is possible to modify the 3D effect. Thus, the apparatus 100 for correcting errors in 3D images in accordance with an embodiment of the present invention can provide more improved 3D images to the viewer by detecting errors in the depth map information for creating the 3D effect.

The 3D effect corresponds to a subjective judgment that varies significantly depending on the viewer's age, standard, etc., but the difference in perceiving the 3D effect may be determined by the following objective items. That is, the difference is apparent when there are objects having a large difference in the depth map information in one image at the same time, when the left and right images have a large difference from the angles of the human eyes, when a 3D effect which is naturally present and a 3D effect which is applied to an image are perceived differently in a specific object or a specific area, or when the 3D effect is intentionally increased to emphasize the 3D effect.

As mentioned above, the case where there are objects having a large difference in the depth map information in one image at the same time, or the case where left and right images have a large difference from the angles of the human eyes is mainly caused when the image is taken by a 3D camera, which significantly depends on the skill of a photographer. Meanwhile, the case where a 3D effect which is naturally present and a 3D effect which is applied to an image are perceived differently in a specific object or a specific area, or the case where the 3D effect is intentionally increased to emphasize the 3D effect may be mitigated to some extent by detecting errors in the depth map information and correcting the errors by means of the apparatus 100 for correcting errors in 3D images, which is the reception unit receiving the corresponding image. In particular, when the apparatus 100 for correcting errors in 3D images, which is the reception unit, estimates the depth map information from the 2D image data and converts the 2D image data into a left-eye image and a right-eye image for a 3D image based on the estimated depth map information, a variety of processes such as the recognition and analysis of an image, the separation of an object, the determination of the distance perspective of an object, etc. are carried out. Accordingly, an error occurs during the 3D image conversion, and thus the error may be included in the depth map information. Due to this error, the viewer of the 3D image feels dizzy. That is, when receiving separate depth map information from the image content provider or estimates the depth map information from the 2D image data, the apparatus 100 for correcting errors in 3D images can detect the error from the depth map information. For example, when an object located at a short distance is shown far away from an object located at a long distance, it is impossible to restore it to its original form, but it is possible to detect the error contained in the depth map information and correct the error by means of the apparatus 100 for correcting errors in 3D images.

Moreover, the 3D image may be displayed by depth image-based rendering (DIBR). The depth image-based rendering refers to a method for creating frames at different viewpoints using reference images having information on the depth, differential angle, etc. in each related pixel. The depth image-based rendering can easily render an inexpressible and complex shape of a 3D model and enable the application of signal processing such as general image filtering, thus producing high-quality 3D images. The depth image-based rendering uses a depth image and a texture image, which are captured by a depth camera and a multi-view camera.

Moreover, the depth image is an image which displays the distance between an object located in a 3D space and a camera taking the object in units of black and white. The depth image is used in 3D restoration or 3D warping through depth map information and camera parameters. Moreover the depth image is applied to a free viewpoint TV or 3D TV. The free viewpoint TV refers to a TV that allows a user to view an image from any viewpoint, not from a predetermined viewpoint, according to the selection of the user. The 3D TV provides an image obtained by adding a depth image to a 2D image. For smooth viewpoint transition in the free viewpoint TV and the 3D TV, it is necessary to generate an intermediate image, and thus it is necessary to estimate accurate depth map information. Meanwhile, in the present invention, the method for estimating the depth map information will be described in detail with reference to the depth map estimation unit 114 later.

The image reception unit 112 determines whether depth map information on input image data is input separately and, if it is determined that the depth map information is input separately, transmits the depth map information to the depth map reception unit 120.

If the depth map information on the input image data is not input separately, the depth map estimation unit 114 estimates the depth map information for each frame of the input image data and transmits the estimated depth map information to the depth map reception unit 120. That is, the depth map estimation unit 114 estimates the depth map information for each pixel present in each frame of the input image data. Here, each pixel may comprise R, G, and B sub-pixels. Moreover, the input image data refers to the 2D image data. Meanwhile, the depth map estimation unit 114 may use a stereo matching algorithm as a general method for estimating the depth map information. The stereo matching algorithm searches a surrounding image only in the horizontal direction to obtain a variation value and inputs an image captured with a parallel camera configuration or an image subjected to rectification only. The depth map information described in the present invention refers to information that indicates the sense of depth and may be called a Z-buffer.

Moreover, the depth map estimation unit 114 analyzes each frame to estimate the depth map information using at least one of information about the inclination of a screen, the shadow of an object, the focus of the screen, and the object pattern. For example, the depth map estimation unit 114 may estimate the depth map information by determining that an object located at the bottom of the screen in a frame is near and an object located at the top is far based on the inclination in the frame. Moreover, the depth map estimation unit 114 may estimate the depth map information by determining that a dark portion of an object in the frame is far and a bright portion of the object is near based on the shadow of the object. That is, this method uses the principle that the shadow is always behind the object. Moreover, the depth map estimation unit 114 may estimate the depth map information by determining that a sharp object is in front and a blurred object is at the rear based on the focus of the screen. Furthermore, the depth map estimation unit 114 may estimate the depth map information by determining, if there are successive patterns of the same type, that a large size pattern is in front of a small size pattern based on the object pattern.

The depth map reception unit 120 receives the depth map information on the image data input from the image reception unit 112 or the depth map estimation unit 114. That is, the depth map reception unit 120 receives the depth map information separately through the image reception unit 112, except for the image data, when receiving the depth map information separately from the image data from the image content provider. Moreover, the depth map reception unit 120 receives the depth map information estimated by the depth map estimation unit 114 from the input image data, when receiving the image data, except for the depth map information, from the image content provider.

The spatial histogram generation unit 122 generates spatial histogram information using the depth map information on the input image data. The spatial histogram generation unit 122 generates spatial histogram information by histogramming the depth map information on the horizontal (X) axis and the vertical (Y) axis for each of the objects, classified according to the depth map information, in each frame of the input image data. The spatial histogram generation unit 122 generates a spatial histogram table by histogramming the depth map information for each object. That is, the spatial histogram information described in the present invention refers to information obtained by histogramming the object, classified according to the depth map information, on the horizontal (X) axis and the vertical (Y) axis.

The 2D image reception unit 130 receives 2D image data of the image data input from the image reception unit 112 or the depth map estimation unit 114. That is, the 2D image reception unit 130 receives the 2D image data through the image reception unit 112, except for the depth map information, when receiving the depth map information separately from the image data from the image content provider. Moreover, the 2D image reception unit 130 receives only the 2D image data through the depth map estimation unit 114, when receiving the image data, except for the depth map information, from the image content provider.

The peak frequency generation unit 132 generates a peak frequency using the 2D image data of the input image data. The peak frequency generation unit 132 divides each frame of the input image data into a plurality of areas by scanning the frame in units of predetermined macroblocks and calculates the peak frequency using a pixel value of each of the divided areas. To calculate the peak frequency, the peak frequency generation unit 132 divides frequency components of each frame into high-frequency components and low-frequency components using Fast Fourier Transform (FFT) and determines the ratio of the coefficients of the high-frequency components as the peak frequency. The peak frequency generation unit 132 generates a peak frequency table based on the peak frequency calculated for each area. The macroblocks described in the present invention may have various sizes, such as 8×8, 16×16, 32×32, 8×16, 16×8, 16×32, 32×16, etc., and may have various sizes according to the object in the corresponding frame. Moreover, the frame may be scanned in units of macroblocks having sub-blocks.

The object analysis unit 140 detects an error in each frame of the input image data based on the spatial histogram received from the spatial histogram generation unit 122 and the peak frequency received from the peak frequency generation unit 132. If the spatial histogram information included in the object exceeds a first threshold, the object analysis unit 140 classifies the corresponding area of the object as an error-prone area 410. Moreover, if a specific value beyond a standard deviation of the spatial histogram information included in the object exceeds the first threshold in the positive (+) direction or negative (−) direction of the vertical (Y) axis of the first threshold, the object analysis unit 140 classifies the area corresponding to the specific value as the error-prone area 410. Moreover, the object analysis unit 140 selects an area corresponding to the error-prone area 410 from the plurality of areas divided by scanning each frame of the input image data in units of predetermined macroblocks and, if the peak frequency of the selected area exceeds a second threshold, determines that there is an error in the depth map information of the error-prone area 410, thus recognizing the error-prone area 410 as an error-containing area. Furthermore, if the peak frequency corresponding to the error-prone area 410 exceeds the second threshold in the positive (+) direction or negative (−) direction and if the result of the positive (+) direction or negative (−) direction, in which the peak frequency exceeds the first threshold, and the result of the positive (+) direction or negative (−) direction, in which the peak frequency exceeds the second threshold, do not coincide with each other, the object analysis unit 140 determines that there is an error in the depth map information of the error-prone area 410, thus recognizing the error-prone area 410 as the error-containing area.

When it is determined that there is an error in the frame, the depth map error correction unit 150 corrects the depth map information such that the error is corrected. Moreover, the depth map error correction unit 150 corrects the error in the depth map information of the error-containing area. For example, while the depth map error correction unit 150 may be implemented to correct the errors in the depth map information of the entire frame, the depth map error correction unit 150 may be implemented to correct the depth map information of the error-containing area, if the error-containing area is determined by the object analysis unit 140. Moreover, if a specific value beyond the standard deviation of the spatial histogram information on the error-containing area exceeds the first threshold in the positive (+) direction of the vertical (Y) axis of the first threshold, the depth map error correction unit 150 functions to decrease the specific value exceeding the first threshold in the positive (+) direction to the standard deviation of the spatial histogram information. Furthermore, if a specific value beyond the standard deviation of the spatial histogram information on the error-containing area exceeds the first threshold in the negative (−) direction of the vertical (Y) axis of the first threshold, the depth map error correction unit 150 functions to increase the specific value exceeding the first threshold in the negative (−) direction to the standard deviation of the spatial histogram information.

Another embodiment of the apparatus 100 for correcting errors in 3D images shown in FIG. 1 will now be described. The spatial histogram generation unit 122 generates the entire spatial histogram information on one frame as a default and, if the generated spatial histogram is larger than a specific area, creates a spatial histogram table. Here, each element of the created spatial histogram table may be separated as one object. The object analysis unit 140 calculates the peak frequency of the corresponding object by analyzing the peak frequency in the corresponding area of the 2D image data for each object separated by the peak frequency generation unit 132. That is, the object analysis unit 140 has the spatial histogram information and the peak frequency with respect to each object through the spatial histogram generation unit 122 and the peak frequency generation unit 132. Here, the spatial histogram table and the peak frequency table that the object analysis unit 140 obtains are shown in the following Table 1:

TABLE 1

| First Object | Coordinates (x, y) & Area, Spatial Histogram Information, Peak Frequency Value |
|---|---|
| Second Object | Coordinates (x, y) & Area, Spatial Histogram Information, Peak Frequency Value |
| ... | ... |
| Nth Object | Coordinates (x, y) & Area, Spatial Histogram Information, Peak Frequency Value |

Moreover, the object analysis unit 140 may determines an object that satisfies the conditions set forth in Table 2 using the variables of the spatial histogram table and the peak frequency table obtained through the spatial histogram generation unit 122 and the peak frequency generation unit 132, which can be represented in a C program as shown in Table 2.

TABLE 2

```
for(i=1; i<= n; i++)
{
    if( object [i].area > area_threshold)
    {
        if( object [i].histogram > plus_histogram_threshold) //+ direction
        {
            if( object [i].peak_frequency < peak_frequency_threshold)
            {
                object [i].result = error;
            }
        }
        else if( object [i].histogram < minus_histogram_threshold)//-direction
        {
            if( object [i].peak_frequency > peak_frequency_threshold)
            {
                object [i].result = error;
            }
        }
    }
}
```

That is, as shown in Table 2, while it is expected that there is an object having large spatial histogram information in the positive (+) direction (short distance), if the peak frequency component value is small, the corresponding object is most likely to be an object that is not present at a short distance, and thus the depth map correction unit 150 of the apparatus 100 for correcting errors in 3D images determines that there is an error in the corresponding depth map information and decreases the depth map information of the corresponding area. Meanwhile, while it is expected that there is an object having large spatial histogram information in the negative (−) direction (long distance), if the peak frequency component value is large, the corresponding object is most likely to be an object that is not present at a long distance, and thus the depth map correction unit 150 of the apparatus 100 for correcting errors in 3D images determines that there is an error in the corresponding depth map information and increases the depth map information of the corresponding area. That is, the depth map information of the corresponding object is controlled based on these variables. Of course, the above-mentioned example cannot be satisfied under all conditions, but if the detected errors are corrected by about 80%, many errors can be corrected in the average image.

The rendering processing unit 160 produces a left-eye image and a right-eye image for a 3D image using the corrected depth map information. That is, the rendering processing unit 160 produces the left-eye image and the right-eye image for the 3D image by applying the corrected depth map information to the 2D image data.

Figure 2:
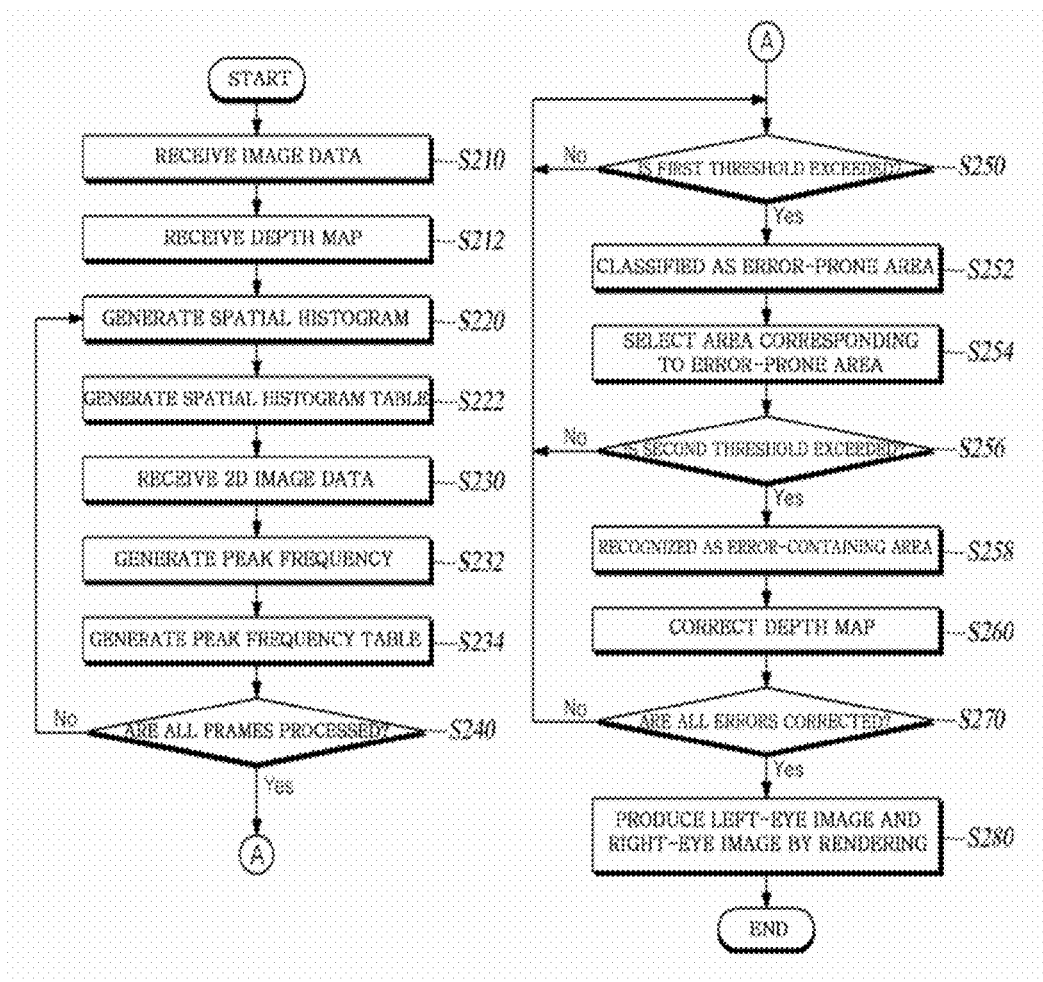
FIG. 2 is a flowchart illustrating a method for correcting errors in 3D images in accordance with an embodiment of the present invention.

FIG. 2 is a flowchart illustrating a method for correcting errors in 3D images in accordance with an embodiment of the present invention.

An apparatus 100 for correcting errors in 3D images receives image data from an image content provider (S210). That is, an image reception unit 112 of the apparatus 100 for correcting errors in 3D images determines whether depth map information on input image data is input separately and, if it is determined that the depth map information is input separately, transmits the depth map information to a depth map reception unit 120. Meanwhile, if the depth map information on the input image data is not input separately, the depth map estimation unit 114 of the apparatus 100 for correcting errors in 3D images estimates depth map information for each frame of the input image data and transmits the estimated depth map information to the depth map reception unit 120. Here, the depth map estimation unit 114 may analyze each frame to estimate the depth map information using at least one of information about the inclination of a screen, the shadow of an object, the focus of the screen, and the object pattern.

The depth map reception unit 120 of the apparatus 100 for correcting errors in 3D images receives the depth map information on the image data input from the image reception unit 112 or the depth map estimation unit 114 (S212). That is, the depth map reception unit 120 of the apparatus 100 for correcting errors in 3D images receives the depth map information separately through the image reception unit 112, except for the image data, when receiving the depth map information separately from the image data from the image content provider. Moreover, the depth map reception unit 120 of the apparatus 100 for correcting errors in 3D images receives the depth map information estimated by the depth map estimation unit 114 from the input image data, when receiving the image data, except for the depth map information, from the image content provider.

A spatial histogram generation unit 122 of the apparatus 100 for correcting errors in 3D images generates spatial histogram information using the depth map information on the input image data (S220). The spatial histogram generation unit 122 of the apparatus 100 for correcting errors in 3D images generates spatial histogram information by histogramming the depth map information on the horizontal (X) axis and the vertical (Y) axis for each of the objects, classified according to the depth map information, in each frame of the input image data. The spatial histogram generation unit 122 of the apparatus 100 for correcting errors in 3D images generates a spatial histogram table by histogramming the depth map information for each object (S222).

A 2D image reception unit 130 of the apparatus 100 for correcting errors in 3D images receives 2D image data of the image data input from the image reception unit 112 or the depth map estimation unit 114 (S230). That is, the 2D image reception unit 130 of the apparatus 100 for correcting errors in 3D images receives the 2D image data through the image reception unit 112, except for the depth map information, when receiving the depth map information separately from the image data from the image content provider. Moreover, the 2D image reception unit 130 of the apparatus 100 for correcting errors in 3D images receives only the 2D image data through the depth map estimation unit 114, when receiving the image data, except for the depth map information, from the image content provider.

The peak frequency generation unit 132 of the apparatus 100 for correcting errors in 3D images generates a peak frequency using the 2D image data of the input image data (S232). That is, the peak frequency generation unit 132 of the apparatus 100 for correcting errors in 3D images divides each frame of the input image data into a plurality of areas by scanning the frame in units of predetermined macroblocks and calculates the peak frequency using a pixel value of each of the divided areas. To calculate the peak frequency, the peak frequency generation unit 132 divides frequency components of each frame into high-frequency components and low-frequency components using FFT and determines the ratio of the coefficients of the high-frequency components as the peak frequency. The peak frequency generation unit 132 generates a peak frequency table based on the peak frequency calculated for each area (S234).

An object analysis unit 140 of the apparatus 100 for correcting errors in 3D images determines whether the spatial histogram information and the peak frequency are generated with respect to the entire frame included in the input image data (S240). If it is determined at step S240 that the spatial histogram information and the peak frequency are generated with respect to the entire frame included in the input image data, the object analysis unit 140 of the apparatus 100 for correcting errors in 3D images determines whether the spatial histogram information included in the object, classified according to the depth map information, exceeds a first threshold (S250). Meanwhile, if it is determined at step S240 that the spatial histogram information and the peak frequency are not generated with respect to the entire frame included in the input image data, the apparatus 100 for correcting errors in 3D images repeats steps S220 to S234.

If it is determined at step S250 that the spatial histogram information included in the object, classified according to the depth map information, exceeds the first threshold, the object analysis unit 140 of the apparatus 100 for correcting errors in 3D images classifies the corresponding area of the object, which exceeds the first threshold, as an error-prone area 410 (S252). That is, if a specific value beyond a standard deviation of the spatial histogram information included in the object exceeds the first threshold in the positive (+) direction or negative (−) direction of the vertical (Y) axis of the first threshold, the object analysis unit 140 of the apparatus 100 for correcting errors in 3D images classifies the area corresponding to the specific value as the error-prone area 410.

The object analysis unit 140 of the apparatus 100 for correcting errors in 3D images selects an area corresponding to the error-prone area 410 from the plurality of areas divided by scanning each frame of the input image data in units of predetermined macroblocks (S254). The object analysis unit 140 of the apparatus 100 for correcting errors in 3D images determines whether the peak frequency of the area selected at step S254 exceeds a second threshold (S256).

If it is determined at step S256 that the peak frequency of the selected area exceeds the second threshold, the object analysis unit 140 of the apparatus 100 for correcting errors in 3D images determines that there is an error in the depth map information of the error-prone area 410 and recognizes the error-prone area 410 as an error-containing area (S258). That is, if the peak frequency corresponding to the error-prone area 410 exceeds the second threshold in the positive (+) direction or negative (−) direction and if the result of the positive (+) direction or negative (−) direction, in which the peak frequency exceeds the first threshold, and the result of the positive (+) direction or negative (−) direction, in which the peak frequency exceeds the second threshold, do not coincide with each other, the object analysis unit 140 of the apparatus 100 for correcting errors in 3D images determines that there is an error in the depth map information of the error-prone area 410 and recognizes the error-prone area 410 as the error-containing area.

The depth map correction unit 150 of the apparatus 100 for correcting errors in 3D images corrects the error in the depth map information of the error-containing area (S260). That is, if a specific value beyond the standard deviation of the spatial histogram information on the error-containing area exceeds the first threshold in the positive (+) direction of the vertical (Y) axis of the first threshold, the depth map error correction unit 150 of the apparatus 100 for correcting errors in 3D images decreases the specific value exceeding the first threshold in the positive (+) direction to the standard deviation of the spatial histogram information. Meanwhile, if a specific value beyond the standard deviation of the spatial histogram information on the error-containing area exceeds the first threshold in the negative (−) direction of the vertical (Y) axis of the first threshold, the depth map error correction unit 150 of the apparatus 100 for correcting errors in 3D images increases the specific value exceeding the first threshold in the negative (−) direction to the standard deviation of the spatial histogram information.

The depth map error correction unit 150 of the apparatus 100 for correcting errors in 3D images determines whether the errors in the depth map information of all the error-containing areas are corrected (S270). If it is determined at step S270 that the errors in the depth map information of all the error-containing areas are corrected by the depth map error correction unit 150 of the apparatus 100 for correcting errors in 3D images, a rendering processing unit 160 of the apparatus 100 for correcting errors in 3D images produces a left-eye image and a right-eye image for a 3D image using the corrected depth map information (S280). That is, the rendering processing unit 160 produces the left-eye image and the right-eye image for the 3D image by applying the corrected depth map information to the 2D image data.

While it is described in FIG. 2 that steps S210 to S280 are sequentially performed, this is intended merely to illustrate the technical idea of an embodiment of the present invention, and those skilled in the art to which the present invention pertains will appreciate that various modifications and changes are made to the method for correcting errors in 3D images shown in FIG. 2 in such a manner that the sequence shown in FIG. 2 is changed or at least two of steps S210 to S280 are performed in parallel, and thus FIG. 2 is not limited in time-series order.

As mentioned above, the method for correcting errors in 3D images in accordance with an embodiment of the present invention shown in FIG. 2 may be implemented as a program and recorded in a computer-readable recording medium. The computer-readable recording medium, in which the program for implementing the method for correcting errors in 3D images in accordance with an embodiment of the present invention is recorded, comprises all types of recording devices in which data readable by a computer system is stored. Examples of the computer-readable recording medium may include ROMs, RAMS, CD-ROMs, magnetic tape, floppy discs, optical data storage devices, etc. Moreover, the computer-readable recording medium may be implemented in the form of carrier wave (e.g., transmission through the Internet). Furthermore, the computer-readable recording media are distributed in computer systems connected through the network such that a computer-readable code can be stored and executed in a distributed manner. In addition, functional programs, code, and code segments for implementing the embodiment of the present invention can be easily construed by programmers skilled in the art to which the present invention pertains.

Figure 3:
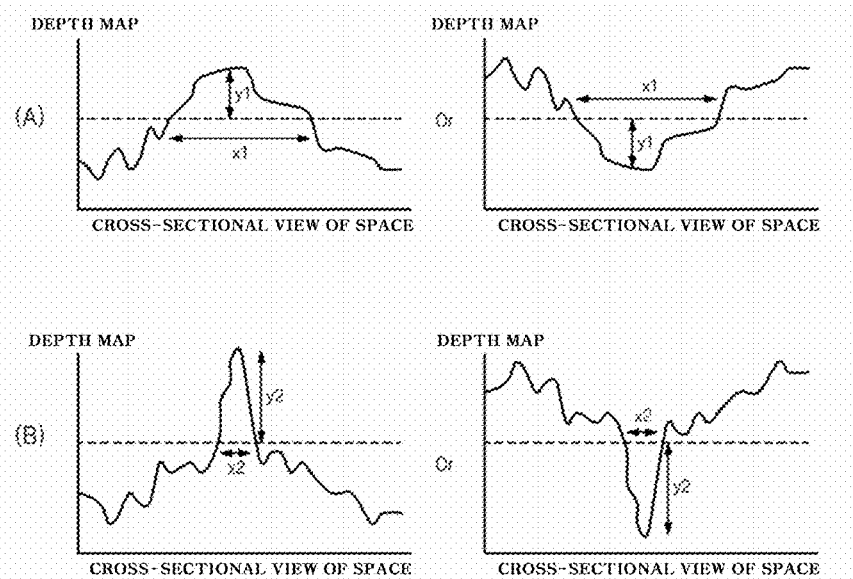
FIG. 3 is an illustrative diagram showing a spatial histogram in accordance with an embodiment of the present invention.

FIG. 3 is an illustrative diagram showing a spatial histogram in accordance with an embodiment of the present invention.

There are characteristics of depth map information which hardly occur when analyzing general image data and, when these characteristics are examined statistically, errors are most likely to occur due to image analysis. According to the depth map information, a very small object is rarely located at a long distance or at a short distance away from the surrounding area in the natural state. Moreover, the depth map information has low spatial frequency characteristics, which are about half of the image resolution and displays the degree of distance in a single channel, i.e., in a black and white image. Accordingly, when the image content provider transmits the depth map information separately, the depth map information corresponds to about 10% of the amount of 2D image data in view of compression. As mentioned above, it is possible to detect an area corresponding to the error by considering the general characteristics of the depth map information as the preconditions.

As shown in (A) and (B) of FIG. 3, the horizontal (X) axis is a cross section obtained by cutting the 2D space of a screen in a horizontal space, and the vertical (Y) axis represents the depth map information on an object located at a shorter distance as the value is larger. The object analysis unit 140 of the apparatus 100 for correcting errors in 3D images detects an error in each frame of the input image data based on the spatial histogram received from the spatial histogram generation unit 122 and the peak frequency received from the peak frequency generation unit 132. As shown in (A) and (B) of FIG. 3, if the spatial histogram information included in the object exceeds a first threshold (i.e., a dotted line in the middle), the object analysis unit 140 of the apparatus 100 for correcting errors in 3D images classifies the corresponding area of the object as an error-prone area 410.

In more detail, it can be seen from the left graph shown in (A) of FIG. 3 that, if the dotted line in the middle is assumed to be the first threshold, the depth map information values of the area exceeding the first threshold in the positive (+) direction are widespread. On the contrary, it can be seen from the right graph shown in (A) of FIG. 3 that, if the dotted line in the middle is assumed to be the first threshold, the depth map information values of the area exceeding the first threshold in the negative (−) direction are widespread. Meanwhile, it can be seen from the left graph shown in (B) of FIG. 3 that, if the dotted line in the middle is assumed to be the first threshold, the depth map information values of the area exceeding the first threshold in the positive (+) direction are narrowly distributed. On the contrary, it can be seen from the right graph shown in (B) of FIG. 3 that, if the dotted line in the middle is assumed to be the first threshold, the depth map information values of the area exceeding the first threshold in the negative (−) direction are narrowly distributed widespread.

That is, if the values of the graph shown in (A) of FIG. 3 are assumed to be y1/x1 and if the values of the graph shown in (B) of FIG. 3 are assumed to be y2/x2, the values of the graph shown in (B) of FIG. 3, y2/x2, are greater than the values of the graph shown in (A) of FIG. 3, y1/x1. When the foregoing is spatially expressed, it is possible to create a spatial histogram information table for each object by separating the areas exceeding the first threshold in the positive (+) or negative (−) direction as one object and obtaining the area (corresponding to X) with respect to the separated areas and a standard deviation (corresponding to Y) of the depth map information from the corresponding area.

Figure 4:
FIG. 4 is an illustrative diagram showing input 2D image data in accordance with an embodiment of the present invention.

FIG. 4 is an illustrative diagram showing input 2D image data in accordance with an embodiment of the present invention. The 2D image data as shown in FIG. 4 may be received through the 2D image reception unit 130 from the image data input from the image reception unit 112 or the depth map estimation unit 114. That is, the 2D image data reception unit 130 receives the 2D image data through the image reception unit 112, except for the depth map information, when receiving the depth map information separately from the image data from the image content provider. Moreover, the 2D image reception unit 130 receives only the 2D image data through the depth map estimation unit 114, when receiving the image data, except for the depth map information, from the image content provider.

Figure 5:
FIG. 5 is an illustrative diagram showing normal depth map information of a specific frame in accordance with an embodiment of the present invention.

FIG. 5 is an illustrative diagram showing normal depth map information of a specific frame in accordance with an embodiment of the present invention. That is, the depth map information applied to the image data of FIG. 4 is as shown in FIG. 5. That is, the spatial histogram generation unit 122 of the apparatus 100 for correcting errors in 3D images generates spatial histogram information by histogramming the depth map information on the horizontal (X) axis and the vertical (Y) axis for each of the objects, classified according to the depth map information, in each frame of the input image data.

Figure 6:
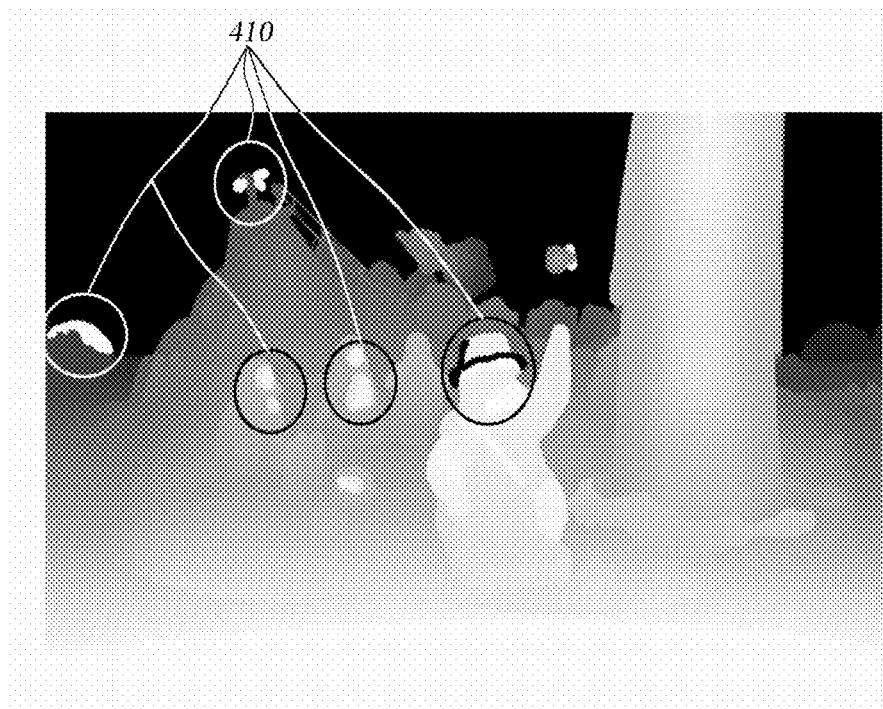
FIG. 6 is an illustrative diagram showing error-prone areas of a specific frame in accordance with an embodiment of the present invention.

FIG. 6 is an illustrative diagram showing error-prone areas of a specific frame in accordance with an embodiment of the present invention. As shown in FIG. 6, the object analysis unit 140 of the apparatus 100 for correcting errors in 3D images detects an error in each frame of the input image data based on the spatial histogram received from the spatial histogram generation unit 122 and the peak frequency received from the peak frequency generation unit 132. If the spatial histogram information included in the object exceeds a first threshold, the object analysis unit 140 classifies the corresponding area of the object as an error-prone area 410 as shown in FIG. 6. That is, as shown in FIG. 6, if the border of the hat of the penguin in front (in the negative (−) direction) and the penguin's face at the rear (in the positive (+) direction) or a part of the background are determined from the human viewpoint, they are obvious errors. These errors can be extracted by analyzing the spatial histogram information. The reason for this is that since the column in front or the body of the penguin is near over a relatively wide space, the spatial histogram information may be small, and the errors of the error-prone areas 410 in FIG. 6 may have very large spatial histogram information.

Figures 7, 8:
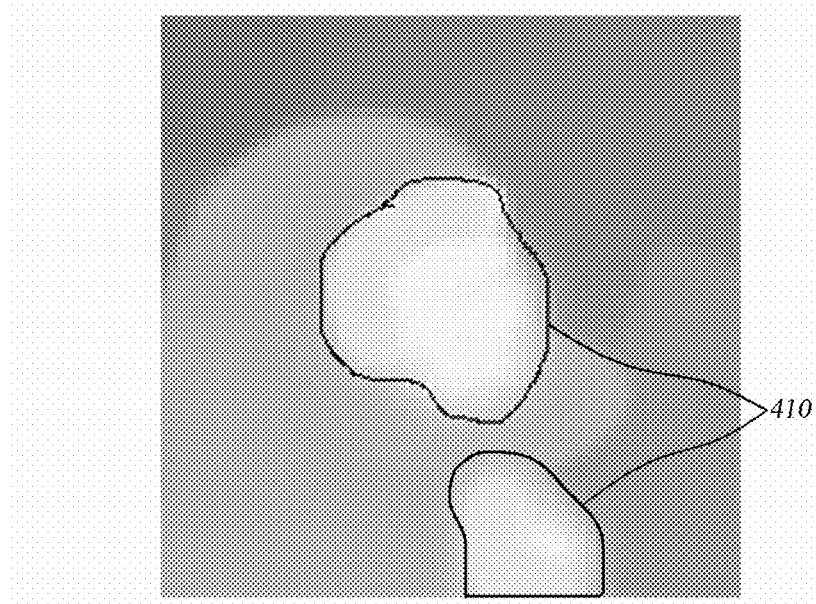
FIG. 7 is an illustrative diagram showing error-prone areas of a specific object in accordance with an embodiment of the present invention.
FIG. 8 is an illustrative diagram showing a peak frequency according to the application of Fast Fourier Transform (FFT) in accordance with an embodiment of the present invention.

FIG. 7 is an illustrative diagram showing error-prone areas of a specific object in accordance with an embodiment of the present invention. When the error-prone areas 410 are determined as shown in FIG. 6, if a specific value beyond a standard deviation of the spatial histogram information included in the object exceeds a first threshold in the positive (+) direction or negative (−) direction of the vertical (Y) axis of the first threshold, the object analysis unit 140 classifies the area corresponding to the specific value as the error-prone area 410. Moreover, the object analysis unit 140 selects an area corresponding to the error-prone area 410 from the plurality of areas divided by scanning each frame of the input image data in units of predetermined macroblocks and, if the peak frequency of the selected area exceeds a second threshold, determines that there is an error in the depth map information of the error-prone area 410, thus recognizing the error-prone area 410 as an error-containing area. Furthermore, if the peak frequency corresponding to the error-prone area 410 exceeds the second threshold in the positive (+) direction or negative (−) direction and if the result of the positive (+) direction or negative (−) direction, in which the peak frequency exceeds the first threshold, and the result of the positive (+) direction or negative (−) direction, in which the peak frequency exceeds the second threshold, do not coincide with each other, the object analysis unit 140 determines that there is an error in the depth map information of the error-prone area 410, thus recognizing the error-prone area 410 as the error-containing area.

As shown in FIG. 7, after the error-prone area 410 of the penguin's face is recognized as the error-containing area, if a specific value beyond the standard deviation of the spatial histogram information on the error-containing area exceeds the first threshold in the positive (+) direction of the vertical (Y) axis of the first threshold, the depth map error correction unit 150 of the apparatus 100 for correcting errors in 3D images functions to decrease the specific value exceeding the first threshold in the positive (+) direction to the standard deviation of the spatial histogram information. Furthermore, if a specific value beyond the standard deviation of the spatial histogram information on the error-containing area exceeds the first threshold in the negative (−) direction of the vertical (Y) axis of the first threshold, the depth map error correction unit 150 of the apparatus 100 for correcting errors in 3D images functions to increase the specific value exceeding the first threshold in the negative (−) direction to the standard deviation of the spatial histogram information.

FIG. 8 is an illustrative diagram showing a peak frequency according to the application of Fast Fourier Transform (FFT) in accordance with an embodiment of the present invention, in which the peak frequency is obtained with respect to the error-prone error 410 of the penguin's face. The peak frequency generation unit 132 of the apparatus 100 for correcting errors in 3D images scans each frame of the input image data in units of predetermined macroblocks to divide the frame into a plurality of areas and calculates a pixel value of each of the divided areas as shown in (A) of FIG. 8.

To calculate the peak frequency, the peak frequency generation unit 132 of the apparatus 100 for correcting errors in 3D images may divide frequency components of each frame into high-frequency components and low-frequency components as shown in (B) of FIG. 2 by applying the FFT to (A) of FIG. 8 and determine the ratio of the coefficient of the high-frequency components as the peak frequency. Moreover, the peak frequency generation unit 132 of the apparatus 100 for correcting errors in 3D images may generate a peak frequency table based on the peak frequency calculated for each area. Here, the macroblocks may have various sizes, such as 8×8, 16×16, 32×32, 8×16, 16×8, 16×32, 32×16, etc., and may have various sizes according to the object in the corresponding frame. Moreover, the frame may be scanned in units of macroblocks having sub-blocks.

As shown in (B) of FIG. 8, the areas corresponding to the upper left side of the 8×8 blocks represent the areas of the low-frequency components, and the areas closer to the lower right side correspond to the areas of the high-frequency components. Thus, the sum of the proportions of the selected areas may be defined as the peak frequency component as shown in (B) of FIG. 8. Here, the high peak frequency value represents a clear portion, which indicates that the object is located at a relatively short distance due to the nature of the image. The high peak frequency value is a criterion to determine whether the object having a large value is in fact located at a short distance. Moreover, the error-prone area 410 has an arbitrary form as shown in FIG. 7, and thus it is possible to scan each frame of the input image data in units of predetermined macroblocks to divide the frame into a plurality of areas, calculate a peak frequency value of each of the divided areas, and determine the average of the peak frequencies of the respective areas as a representative value of the corresponding object.

Meanwhile, Equations 1 and 2 may be used to apply the FFT to (A) of FIG. 8.

$$F(x) = \sum_{n=0}^{N-1} f(n)e^{-j2\pi(x\frac{n}{N})} \quad \text{[Equation 1]}$$

$$f(n) = \frac{1}{N}\sum_{n=0}^{N-1} F(x)e^{j2\pi(x\frac{n}{N})} \quad \text{[Equation 2]}$$

Here, Equations 1 and 2 describe the relationship between the transform of a time function f(n) and the transform of a frequency function F(x). Moreover, Equations 1 and 2 are one-dimensional, but may represent the transform between an image in a space and a spatial frequency component of the image in the case of a 2D image. Meanwhile, Equations 1 and 2 show typical examples of the FFT, and necessary values may be applied to constants included in Equations 1 and 2 to calculate high-frequency components. For example, if f(n) is expressed in spatial pixel coordinates f(m, n) and if the location of the pixel is assumed to be (m, n), F(x, y) is the spatial frequency component.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

[Industrial Applicability]

As described above, the present invention can detect an error in depth map information and corrects the error in the process of providing 3D image content, produced by applying the depth map information to input 2D image content, thus preventing a 3D effect from being reduced by the error in the depth map information. Thus, the present invention is useful and applicable to various fields.

The invention claimed is:

1. An apparatus for correcting errors in three-dimensional (3D) images, the apparatus comprising:
a spatial histogram generation unit which generates spatial histogram information using depth map information on input image data;
a peak frequency generation unit which generates a peak frequency using two-dimensional (2D) image data of the input image data;
an object analysis unit which detects an error in each frame of the input image data based on the spatial histogram and the peak frequency;
a depth map error correction unit which, if it is determined that there is an error in the frame, corrects the depth map information such that the error is corrected; and
a rendering processing unit which produces a left-eye image and a right-eye image to form a 3D image using the corrected depth map information.

2. The apparatus of claim 1, wherein the spatial histogram generation unit generates the spatial histogram information by histogramming the depth map information on the horizontal (X) axis and the vertical (Y) axis for each of objects, classified according to the depth map information, in each frame of the input image data.

3. The apparatus of claim 2, wherein the spatial histogram generation unit generates a spatial histogram table by histogramming the depth map information for each object.

4. The apparatus of claim 1, wherein the peak frequency generation unit divides each frame of the input image data into a plurality of areas by scanning the frame in units of predetermined macroblocks and calculates the peak frequency using a pixel value of each of the divided areas.

5. The apparatus of claim 4, wherein the peak frequency generation unit divides frequency components of each frame into high-frequency components and low-frequency components using Fast Fourier Transform (FFT) and determines the ratio of the coefficients of the high-frequency components as the peak frequency.

6. The apparatus of claim 5, wherein the peak frequency generation unit generates a peak frequency table based on the peak frequency calculated for each area.

7. The apparatus of claim 2, wherein, if the spatial histogram information included in the object exceeds a first threshold, the object analysis unit classifies the corresponding area of the object as an error-prone area.

8. The apparatus of claim 7, wherein, if a specific value beyond a standard deviation of the spatial histogram information included in the object exceeds the first threshold in the positive (+) direction or negative (−) direction of the vertical (Y) axis of the first threshold, the object analysis unit classifies the area corresponding to the specific value as the error-prone area.

9. The apparatus of claim 7, wherein the object analysis unit selects an area corresponding to the error-prone area from the plurality of areas divided by scanning each frame of the input image data in units of predetermined macroblocks and, if the peak frequency of the selected area exceeds a second threshold, determines that there is an error in the depth map information of the error-prone area, thus recognizing the error-prone area as an error-containing area.

10. The apparatus of claim 9, wherein, if the peak frequency corresponding to the error-prone area exceeds the second threshold in the positive (+) direction or negative (−) direction and if the result of the positive (+) direction or negative (−) direction, in which the peak frequency exceeds the first threshold, and the result of the positive (+) direction or negative (−) direction, in which the peak frequency exceeds the second threshold, do not coincide with each other, the object analysis unit determines that there is an error in the depth map information of the error-prone area, thus recognizing the error-prone area as the error-containing area.

11. The apparatus of claim 9, wherein the depth map error correction unit corrects the error in the depth map information of the error-containing area.

12. The apparatus of claim 9, wherein, if a specific value beyond the standard deviation of the spatial histogram information on the error-containing area exceeds the first threshold in the positive (+) direction of the vertical (Y) axis of the first threshold, the depth map error correction unit decreases the specific value exceeding the first threshold in the positive (+) direction to the standard deviation of the spatial histogram information.

13. The apparatus of claim 9, wherein, if a specific value beyond the standard deviation of the spatial histogram information on the error-containing area exceeds the first threshold in the negative (−) direction of the vertical (Y) axis of the first threshold, the depth map error correction unit increases the specific value exceeding the first threshold in the negative (−) direction to the standard deviation of the spatial histogram information.

14. The apparatus of claim 1, further comprising:
a depth map reception unit which receives the depth map information on the image data; and
a 2D image reception unit which receives 2D image data of the input image data.

15. The apparatus of claim 14, further comprising:
an image reception unit which determines whether the depth map information on the input image data is input separately and, if it is determined that the depth map information is input separately, transmits the depth map information to the depth map reception unit; and
a depth map estimation unit which, if the depth map information on the input image data is not input separately, estimates the depth map information for each frame of the input image data and transmits the estimated depth map information to the depth map reception unit.

16. The apparatus of claim 15, wherein the depth map estimation unit analyzes each frame to estimate the depth map information using at least one of information about the inclination of a screen, the shadow of an object, the focus of the screen, and the object pattern.

17. A method for correcting errors in 3D images, the method comprising:
a spatial histogram generation step of generating spatial histogram information using depth map information on input image data;
a peak frequency generation step of generating a peak frequency using 2D image data of the input image data;
an object analysis step of detecting an error in each frame of the input image data based on the spatial histogram and the peak frequency;
a depth map error correction step of, if it is determined that there is an error in the frame, correcting the depth map information such that the error is corrected; and
a rendering processing step of producing a left-eye image and a right-eye image to form a 3D image using the corrected depth map information.

18. The method of claim 17, wherein the spatial histogram generation step comprises the step of generating the spatial histogram information by histogramming the depth map information on the horizontal (X) axis and the vertical (Y) axis for each of objects, classified according to the depth map information, in each frame of the input image data.

19. The method of claim 17, wherein the peak frequency generation step comprises the steps of:
dividing each frame of the input image data into a plurality of areas by scanning the frame in units of predetermined macroblocks;
dividing frequency components of pixels present in each area of the divided areas into high-frequency components and low-frequency components using Fast Fourier Transform (FFT); and
determining the ratio of the coefficients of the high-frequency components as the peak frequency.

20. The method of claim 17, wherein the object analysis step comprises the steps of:
if the spatial histogram information included in the object exceeds a first threshold, classifying the corresponding area of the object as an error-prone area;
selecting an area corresponding to the error-prone area from the plurality of areas divided by scanning each frame of the input image data in units of predetermined macroblocks; and
if the peak frequency of the selected area exceeds a second threshold, determining that there is an error in the depth map information of the error-prone area, thus recognizing the error-prone area as an error-containing area.

21. A method for correcting errors in 3D images, which detects an error in depth map information in the process of providing a 3D image, produced by applying the depth map information to input 2D image data, the method comprising the steps of:
determining a specific value beyond a standard deviation of spatial histogram information generated for each of objects, classified according to the depth map information, in each frame of the 2D image data;
if the specific value exceeds a first threshold in the positive (+) direction or negative (−) direction of the vertical (Y) axis of the first threshold, classifying the area corresponding to the specific value as an error-prone area;
if the peak frequency of the error-prone area exceeds a second threshold in the positive (+) direction or negative (−) direction, determining whether the result of the direction, in which the peak frequency exceeds the first threshold, and the result of the direction, in which the peak frequency exceeds the second threshold, coincide with each other; and
if it is determined that the result of the direction, in which the peak frequency exceeds the first threshold, and the result of the direction, in which the peak frequency exceeds the second threshold, do not coincide with each other, determining that there is an error in the depth map information.

22. A method for correcting errors in 3D images, which corrects an error in depth map information in the process of providing a 3D image, produced by applying the depth map information to input 2D image data, the method comprising the steps of:

determining a specific value beyond a standard deviation of spatial histogram information of an error-containing area determined as having an error in the depth map information;

determining whether the specific value exceeds a first threshold in the positive (+) direction or negative (−) direction of the vertical (Y) axis; and if it is determined that the specific value exceeds the first threshold, correcting the error by increasing or decreasing the specific value to the standard deviation of the spatial histogram information based on the direction in which the specific value exceeds the first threshold.

23. The method of claim 22, wherein the correcting of the error comprises the step of, if it is determined that the specific value exceeds the first threshold in the positive (+) direction of the vertical (Y) axis, decreasing the specific value to the standard deviation of the spatial histogram information and, it is determined that the specific value exceeds the first threshold in the negative (−) direction of the vertical (Y) axis, increasing the specific value to the standard deviation of the spatial histogram information.

24. A method for correcting errors in 3D images, which detects an error in depth map information and corrects the error in the process of providing a 3D image, produced by applying the depth map information to input 2D image data, the method comprising the steps of:

determining a specific value beyond a standard deviation of spatial histogram information generated for each of objects, classified according to the depth map information, in each frame of the 2D image data;

if the specific value exceeds a first threshold, classifying the area corresponding to the specific value as an error-prone area;

if the peak frequency of the error-prone area exceeds a second threshold, determining whether the result of the direction, in which the peak frequency exceeds the first threshold, and the result of the direction, in which the peak frequency exceeds the second threshold, coincide with each other;

if it is determined that the result of the direction, in which the peak frequency exceeds the first threshold, and the result of the direction, in which the peak frequency exceeds the second threshold, do not coincide with each other, determining that there is an error in the depth map information; and correcting the error by increasing or decreasing the specific value to the standard deviation of the spatial histogram information based on the direction in which the specific value exceeds the first threshold.

\* \* \* \* \*